United States Patent
Ibrahim et al.

(10) Patent No.: US 12,074,829 B2
(45) Date of Patent: Aug. 27, 2024

(54) DYNAMIC FULL-DUPLEX MODE SWITCHING FOR SIDELINK

(71) Applicant: QUALCOMM Incorporated, San Diego, CA (US)

(72) Inventors: Abdelrahman Mohamed Ahmed Mohamed Ibrahim, San Diego, CA (US); Seyedkianoush Hosseini, San Diego, CA (US); Muhammad Sayed Khairy Abdelghaffar, San Jose, CA (US); Ahmed Attia Abotabl, San Diego, CA (US); Wei Yang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 17/447,670

(22) Filed: Sep. 14, 2021

(65) Prior Publication Data

US 2023/0083283 A1    Mar. 16, 2023

(51) Int. Cl.
*H04L 5/14*          (2006.01)
*H04W 52/02*      (2009.01)
*H04W 76/28*      (2018.01)
*H04W 92/18*      (2009.01)

(52) U.S. Cl.
CPC .......... *H04L 5/14* (2013.01); *H04W 52/0225* (2013.01); *H04W 76/28* (2018.02); *H04W 92/18* (2013.01)

(58) Field of Classification Search
CPC .... H04L 5/14; H04W 52/0225; H04W 76/28; H04W 92/18; H04W 76/14
See application file for complete search history.

(56) References Cited

U.S. PATENT DOCUMENTS

| | | | |
|---|---|---|---|
| 2014/0086219 A1* | 3/2014 | Suzuki | H04W 56/0005 370/336 |
| 2017/0048647 A1* | 2/2017 | Jung | H04W 4/70 |
| 2023/0063472 A1* | 3/2023 | Freda | H04W 76/28 |

* cited by examiner

*Primary Examiner* — Walli Z Butt
(74) *Attorney, Agent, or Firm* — Harrity & Harrity, LLP

(57) ABSTRACT

Various aspects of the present disclosure generally relate to wireless communication. In some aspects, a first user equipment (UE) may switch from a first sidelink (SL) full-duplex (FD) mode to a second SL FD mode based on at least one of a first SL discontinuous reception (DRX) pattern associated with the first UE or a second SL DRX pattern associated with the second UE. The UE may communicate in accordance with the second SL FD mode. Numerous other aspects are described.

16 Claims, 12 Drawing Sheets

DYNAMIC FULL-DUPLEX MODE SWITCHING FOR SIDELINK

FIELD OF THE DISCLOSURE

Aspects of the present disclosure generally relate to wireless communication and to techniques and apparatuses for dynamic full-duplex mode switching for sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include switching from a first sidelink (SL) full-duplex (FD) mode to a second SL FD mode based on at least one of a first SL discontinuous reception (DRX) pattern associated with the first UE or a second SL DRX pattern associated with the second UE. The method may include communicating in accordance with the second SL FD mode.

Some aspects described herein relate to a method of wireless communication performed by a base station. The method may include determining an SL configuration comprising an FD mode switch indication that indicates that a first UE is to switch from a first SL FD mode to a second SL FD mode based on at least one of a first SL DRX pattern associated with the first UE or a second SL DRX pattern associated with a second UE. The method may include transmitting the SL configuration to the first UE.

Some aspects described herein relate to a first UE for wireless communication. The first user equipment may include a memory and one or more processors coupled to the memory. The one or more processors may be configured to switch from an SL FD mode to a second SL FD mode based on at least one of a first SL DRX pattern associated with the first UE or a second SL DRX pattern associated with the second UE. The one or more processors may be configured to communicate in accordance with the second SL FD mode.

Some aspects described herein relate to a base station for wireless communication. The base station may include a memory and one or more processors coupled to the memory. The one or more processors may be configured to determine an SL configuration comprising an FD mode switch indication that indicates that a first UE is to switch from a first SL FD mode to a second SL FD mode based on at least one of a first SL DRX pattern associated with the first UE or a second SL DRX pattern associated with a second UE. The one or more processors may be configured to transmit the SL configuration to the first UE.

Some aspects described herein relate to a non-transitory computer-readable medium that stores a set of instructions for wireless communication by a first UE. The set of instructions, when executed by one or more processors of the UE, may cause the UE to switch from a first SL FD mode to a second SL FD mode based on at least one of a first SL DRX pattern associated with the first UE or a second SL DRX pattern associated with the second UE. The set of instructions, when executed by one or more processors of the UE, may cause the UE to communicate in accordance with the second SL FD mode.

Some aspects described herein relate to a non-transitory computer-readable medium that stores a set of instructions for wireless communication by a base station. The set of instructions, when executed by one or more processors of the base station, may cause the base station to determine an SL configuration comprising an FD mode switch indication that indicates that a first UE is to switch from a first SL FD mode to a second SL FD mode based on at least one of a first SL DRX pattern associated with the first UE or a second SL DRX pattern associated with a second UE. The set of instructions, when executed by one or more processors of the base station, may cause the base station to transmit the SL configuration to the first UE.

Some aspects described herein relate to an apparatus for wireless communication. The apparatus may include means for switching from a first SL FD mode to a second SL FD mode based on at least one of a first SL DRX pattern associated with the first UE or a second SL DRX pattern associated with the second UE. The apparatus may include means for communicating in accordance with the second SL FD mode.

Some aspects described herein relate to an apparatus for wireless communication. The apparatus may include means for determining an SL configuration comprising an FD mode switch indication that indicates that a first UE is to switch from a first SL FD mode to a second SL FD mode based on at least one of a first SL DRX pattern associated with the first UE or a second SL DRX pattern associated with a second UE. The apparatus may include means for transmitting the SL configuration to the first UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
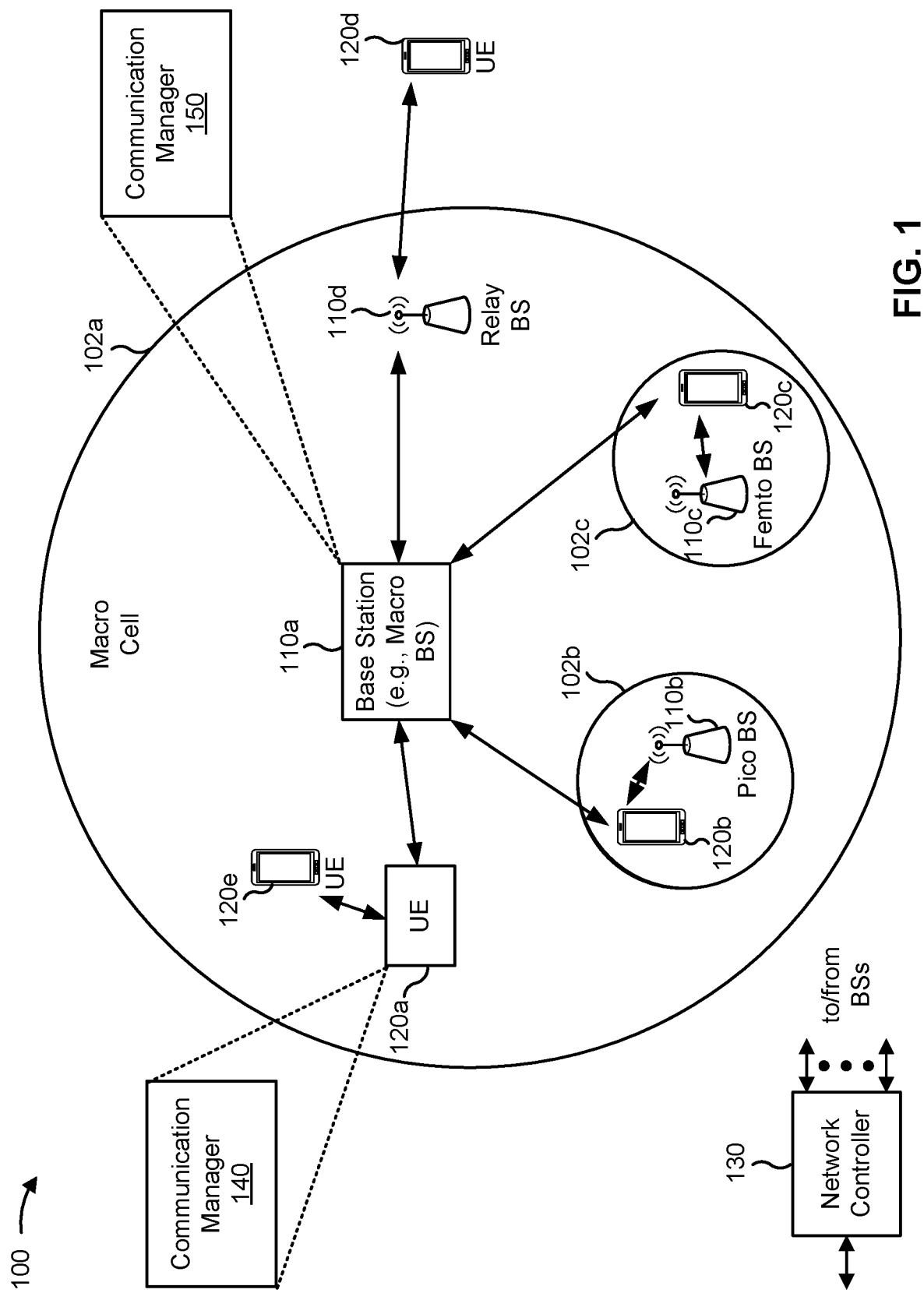
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicleto-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may switch from a first sidelink (SL) full-duplex (FD) mode to a second SL FD mode based on at least one of a first SL discontinuous reception (DRX) pattern associated with the first UE or a second SL DRX pattern associated with the second UE; and communicate in accordance with the second SL FD mode. Additionally, or alternatively, the communication manager 140 may perform one or more other operations described herein.

In some aspects, the base station 110 may include a communication manager 150. As described in more detail elsewhere herein, the communication manager 150 may determine an SL configuration comprising an FD mode switch indication that indicates that a first UE is to switch from a first SL FD mode to a second SL FD mode based on at least one of a first SL DRX pattern associated with the first UE or a second SL DRX pattern associated with a second UE; and transmit the SL configuration to the first UE. Additionally, or alternatively, the communication manager 150 may perform one or more other operations described herein.

As indicated above, FIG. 1 is provided as an example. Other examples may differ from what is described with regard to FIG. 1.

Figure 2:
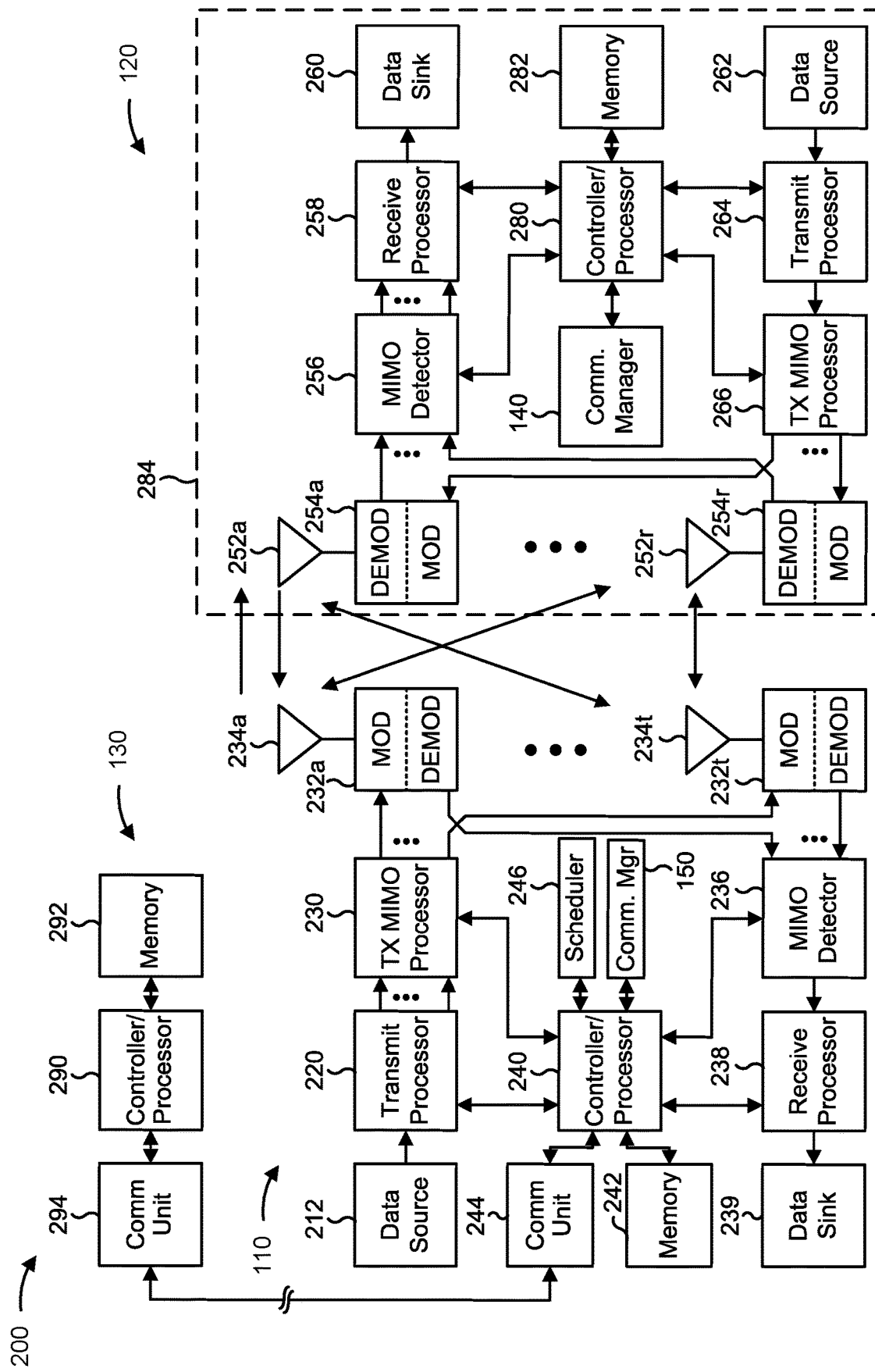
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the base station 110, the controller/processor 280 of the UE 120, and/or any other component(s) of FIG. 2 may perform one or more techniques associated with dynamic FD mode switching for SL, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the first UE includes means for switching from a first SL FD mode to a second SL FD mode based on at least one of a first SL DRX pattern associated with the first UE or a second SL DRX pattern associated with the second UE; and/or means for communicating in accordance with the second SL FD mode. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for determining an SL configuration comprising an FD mode switch indication that indicates that a first UE is to switch from a first SL FD mode to a second SL FD mode based on at least one of a first SL DRX pattern associated with the first UE or a second SL DRX pattern associated with a second UE; and/or means for transmitting the SL configuration to the first UE. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
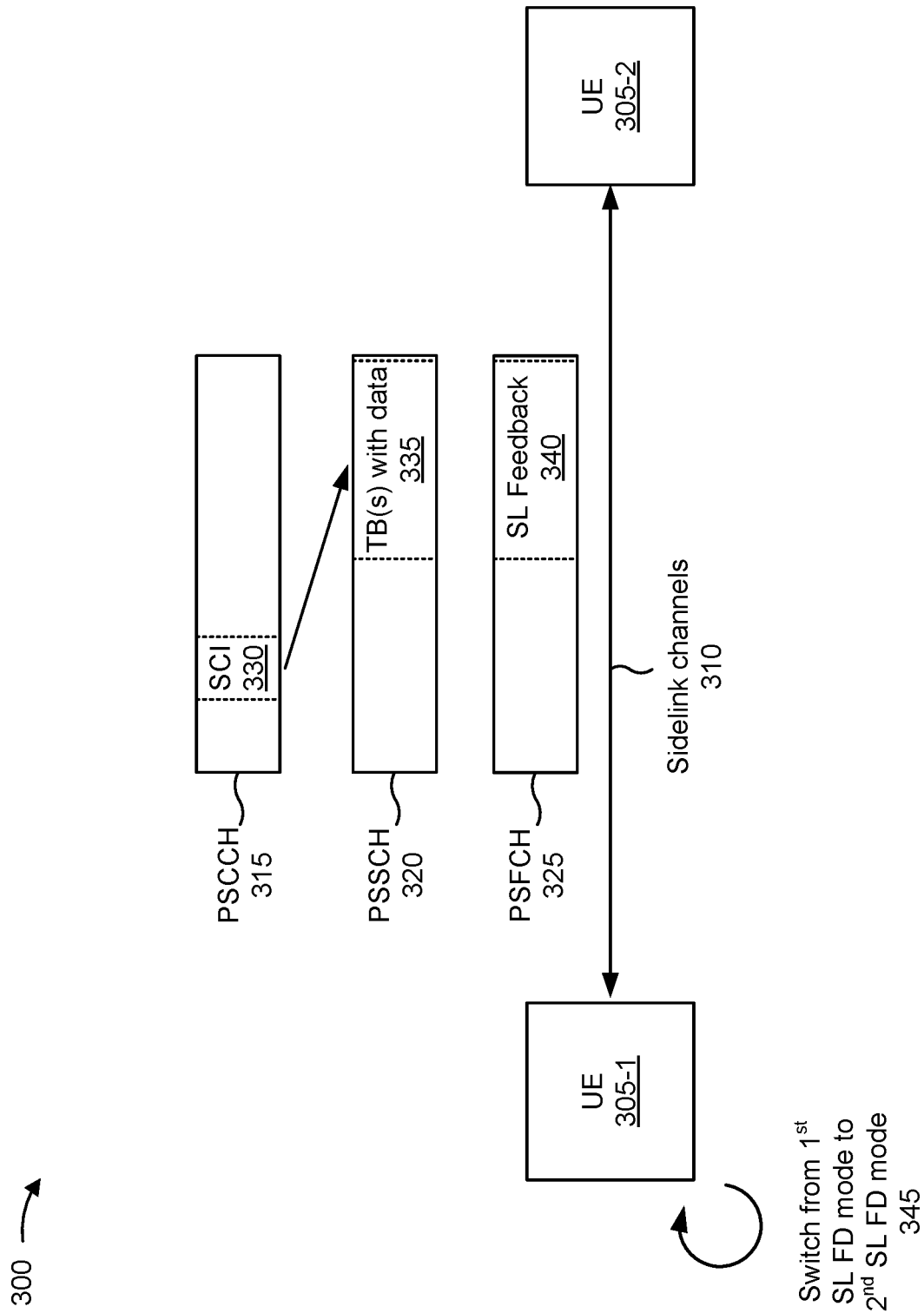
FIGS. 3 and 4 are diagrams illustrating examples of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some aspects, a UE 305 may generate a sidelink grant based on a sidelink DRX pattern. For example, the UE 305-1 may allocate resources for transmitting an SL communication to the UE 305-2 in slots in which an SL DRX pattern associated DRX ON durations of the SL DRX pattern. In some aspects, the UE 305-1 may be capable of FD communication. As shown by reference number 345, the UE 305-1 may switch from a first SL FD mode to a second SL FD mode based on an SL DRX pattern associated with the UE 305-2 and/or an SL DRX pattern associated with the UE 305-1. In this way, some aspects may provide for dynamic FD mode switching for SL based on DRX patterns, thereby using resources and power more efficiently.

As indicated above, FIG. 3 is provided as an example. Other examples may differ from what is described with respect to FIG. 3.

Figure 4:
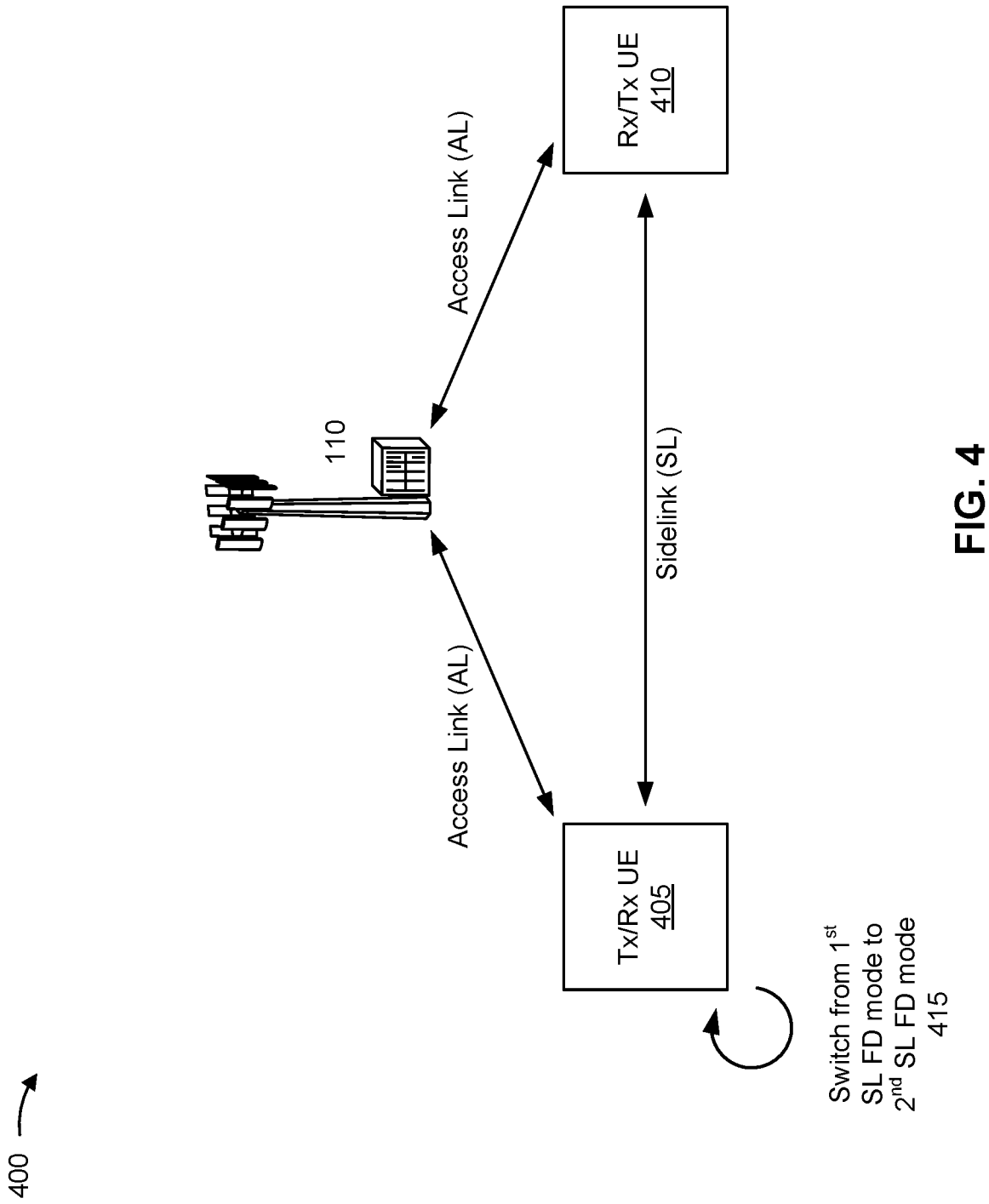

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

Sidelink communications take place in Tx or Rx resource pools. The minimum resource allocation unit is a sub-channel in frequency. In the frequency domain, a sidelink resource pool includes a number of contiguous sub-channels and a sub-channel includes a number of contiguous physical resource blocks (PRBs). In the time domain, resources are allocated by slot. In some cases, some slots are not available for sidelink and some slots contain feedback resources. In half-duplex communications, a UE can transmit or receive, but not both simultaneously. In some cases, a DRX operation can be introduced in SL to save power. For example, an SL DRX pattern can be defined for a UE in which the UE is DRX ON-duration defines when the UE is actively in a reception mode. In general, for a unicast session between two or more UEs, the respective DRX active durations for the two UEs can be partially overlapping or non-overlapping. In partially overlapping cases, half-duplex operation can result in an inefficient use of available resources.

Enabling FD communications can enhance SL communication by facilitating a more efficient use of resources. For example, FD operation can enable a UE to sense while transmitting, thereby improving resource reservation. In some cases, FD operation can enable a UE to sense or receive communications while transmitting, thereby improving resource reservation and resource utilization. However, because half-duplex mode is more energy efficient, operating in FD mode continuously may lead to inefficient power consumption.

Some aspects of techniques and apparatuses described herein may provide dynamic FD mode switching for sidelink. In some aspects, duplex mode switching (e.g., from active to non-active, from non-active to active, from half-duplex to FD, and/or from FD to half-duplex) may be based on SL DRX patterns of one or more UEs. For example, as shown by reference number 415, a first UE 405 may switch from a first SL FD mode to a second SL FD mode based on at least one of a first SL DRX pattern associated with the first UE or a second SL DRX pattern associated with the second UE. The first UE and second UE may communicate in accordance with the second SL FD mode. In this way, some aspects, may facilitate adapting a duplex mode to DRX patterns, thereby enabling the UE to use FD mode when resources are available and to use half-duplex when FD resources are unavailable. Thus, some aspects may facilitate more efficient use of resources as well as power savings.

As indicated above, FIG. 4 is provided as an example. Other examples may differ from what is described with respect to FIG. 4.

Figure 5:
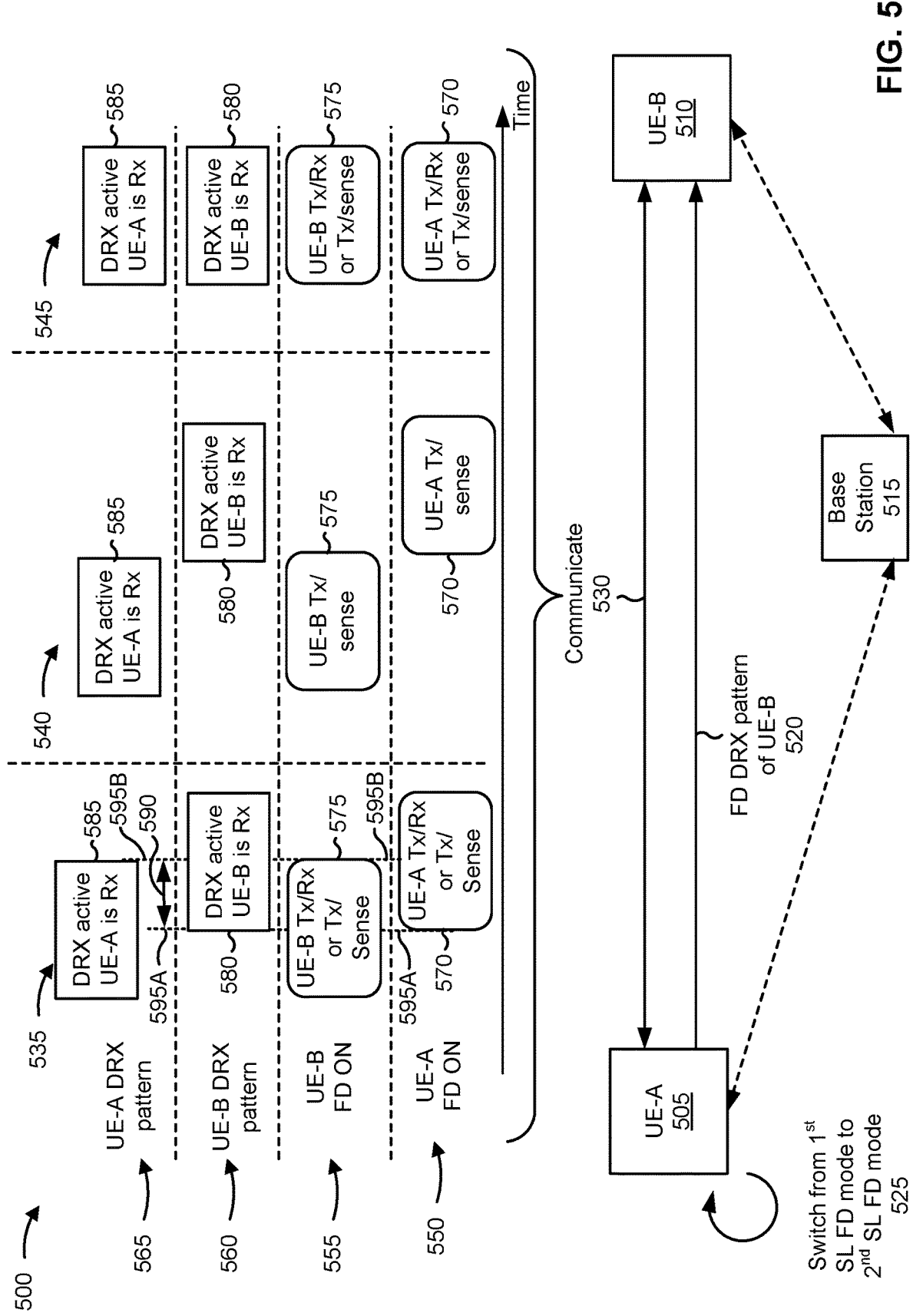
FIG. 5 is a diagram illustrating an example of discontinuous reception (DRX), in accordance with the present disclosure.

FIG. 5 is a diagram illustrating an example 500 associated with dynamic FD mode switching for SL, in accordance with the present disclosure. As shown in FIG. 5, a UE-A 505 and a UE-B 510 may communicate with one another via an SL network. In some aspects, a base station 515 may communicate with the UE-A 505 and/or the UE-B 510. For example, in an SL mode, the base station 515 may allocate SL resources and transmit indications thereof to the UE-A 505 and/or the UE-B 510. In some aspects, any number of additional UEs may communicate with one another and/or the base station 515.

As shown by reference number 520, the UE-A 505 may transmit, and the UE-B 510 may receive, an indication of an FD DRX pattern of the UE-B 510. In some aspects, for example, the UE-A 505 may determine an FD DRX pattern of the UE-B 510 where UE-A 505 is a transmitting UE and the UE-B 510 is a receiving UE. In some aspects, the UE-A 505 and the UE-B 510 may coordinate with one another to determine an FD DRX pattern associated with the UE-A 505 and/or the UE-B 510. For example, in a unicast session, if one of the UEs 505 or 510 is FD capable, the transmitting UE (FD capable) determines its FD DRX pattern. In a unicast/group cast session with multiple FD capable UEs, FD DRX patterns may be coordinated between FD UEs. In some aspects, each transmitting UE that is FD capable may determine its FD DRX pattern. In some aspects, SL DRX and FD DRX patterns may be determined by an FD capable UE transmitting and/or by the base station 515.

In some aspects, an FD DRX ON duration may be defined for a UE-A 505 and/or a UE-B 510 based on ON durations of SL DRX patterns associated with the UE-A 505 and/or a UE-B 510. An FD DRX ON duration associated with a UE is a time period during which the UE is in an FD ON mode. An FD ON mode is a mode of operation in which the UE may perform FD communications. Similarly, a DRX ON duration is a period of time during which a UE may receive communications (e.g., receiving software and/or hardware is active).

As shown by reference number 525, the UE-A 505 may switch from a first SL FD mode to a second SL FD mode and, as shown by reference number 530, the UE-A 505 may communicate based on the second SL FD mode (e.g., the UE-A 505 may engage in FD communications with at least the UE-B 510). In some aspects, the second SL FD mode may include an SL FD ON mode in which an FD capability of the first UE is activated. As discussed above, the SL FD ON mode may correspond to an FD ON duration, and the FD ON duration may be based on at least one of a first DRX ON duration of a first SL DRX pattern associated with the UE-A 505 or a second DRX ON duration of a second SL DRX pattern associated with the UE-B 510.

The SL FD ON duration may be based on a DRX ON duration in any number of ways. Example 500 illustrates three different configurations 535, 540, and 545 having different relationships between an FD ON duration pattern 550 (shown as "UE-A FD ON") associated with the UE-A 505, an FD ON duration pattern 555 (shown as "UE-B FD ON") associated with the UE-B 510, an SL DRX pattern 560 (shown as "UE-B DRX pattern") associated with the UE-B 510, and an SL DRX pattern 565 (shown as "UE-A DRX pattern") associated with the UE-A 505.

As shown by configurations 535 and 545, FD ON durations associated with the UE-A 505 may at least partially overlap and/or align with DRX ON durations of the UE-B 510. A first duration at least partially overlaps a second duration when the two durations have at least one instance of time in common. A first duration completely overlaps the second duration when the entire length (in the time domain) of the second duration is common to both durations and a first duration is completely overlapped by a second duration when the entire length of the first duration is common to both durations. A first duration is aligned with a second duration when a beginning of a first duration occurs at the same time (or within a specified range of time) as a beginning of the second duration.

To realize the benefits of simultaneous transmission and sensing, an FD ON duration of a transmitting UE may at least partially overlap and/or be aligned with an SL DRX ON duration of a receiving UE. For example, as shown, the configuration 535 includes a UE-A FD ON duration 570 that is aligned with a UE-B DRX ON duration 580 and that overlaps the UE-B DRX ON duration 580. In some aspects, the UE-A FD ON duration 570 may at least partially overlap the UE-B DRX ON duration 580. As shown, during the UE-A FD ON duration 570, the UE-A 505 may transmit and receive in an FD manner and/or may transmit and sense (e.g., obtain measurements associated with a communication channel) in an FD manner During the UE-B DRX ON duration, the UE-B 510 may receive communications. In the configuration 545, the UE-A FD ON duration 570 is aligned with and overlaps the UE-B DRX ON duration 580, thereby facilitating simultaneous transmission and sensing. Additionally, in the configuration 540, the UE-A FD ON duration 570 is aligned with and overlaps the UE-B DRX ON duration 580, thereby facilitating simultaneous transmission and sensing. However, because UE-A FD ON duration 570 does not even partially overlap the UE-A DRX ON duration 585, the configuration 540 may not realize the benefits of simultaneous transmission and reception.

To realize the benefits of simultaneous transmission and reception, an FD ON duration of a transmitting UE may at least partially overlap and/or be aligned with an intersection of an SL DRX ON duration associated with the UE and an SL DRX ON duration of another UE with which the UE is communicating. For example, the intersection 590 of the UE-B DRX ON duration 580 and the UE-A DRX ON duration 585 is the time period that is common to both durations 580 and 585. As shown, the UE-A FD ON duration 570 is aligned with and partially overlaps the intersection 590, as indicated by the dotted reference lines 595A and 595B. Additionally, in the configuration 545, the UE-A FD ON duration 570 is aligned with and overlaps the intersection of the UE-B DRX ON duration 580 and the UE-A DRX ON duration 585, which, in the configuration 545, includes the entirety of each duration 580 and 585. Thus, the configurations 535 and 545 may facilitate simultaneous transmission and reception.

As indicated above, FIG. 5 is provided as an example. Other examples may differ from what is described with respect to FIG. 5.

Figure 6:
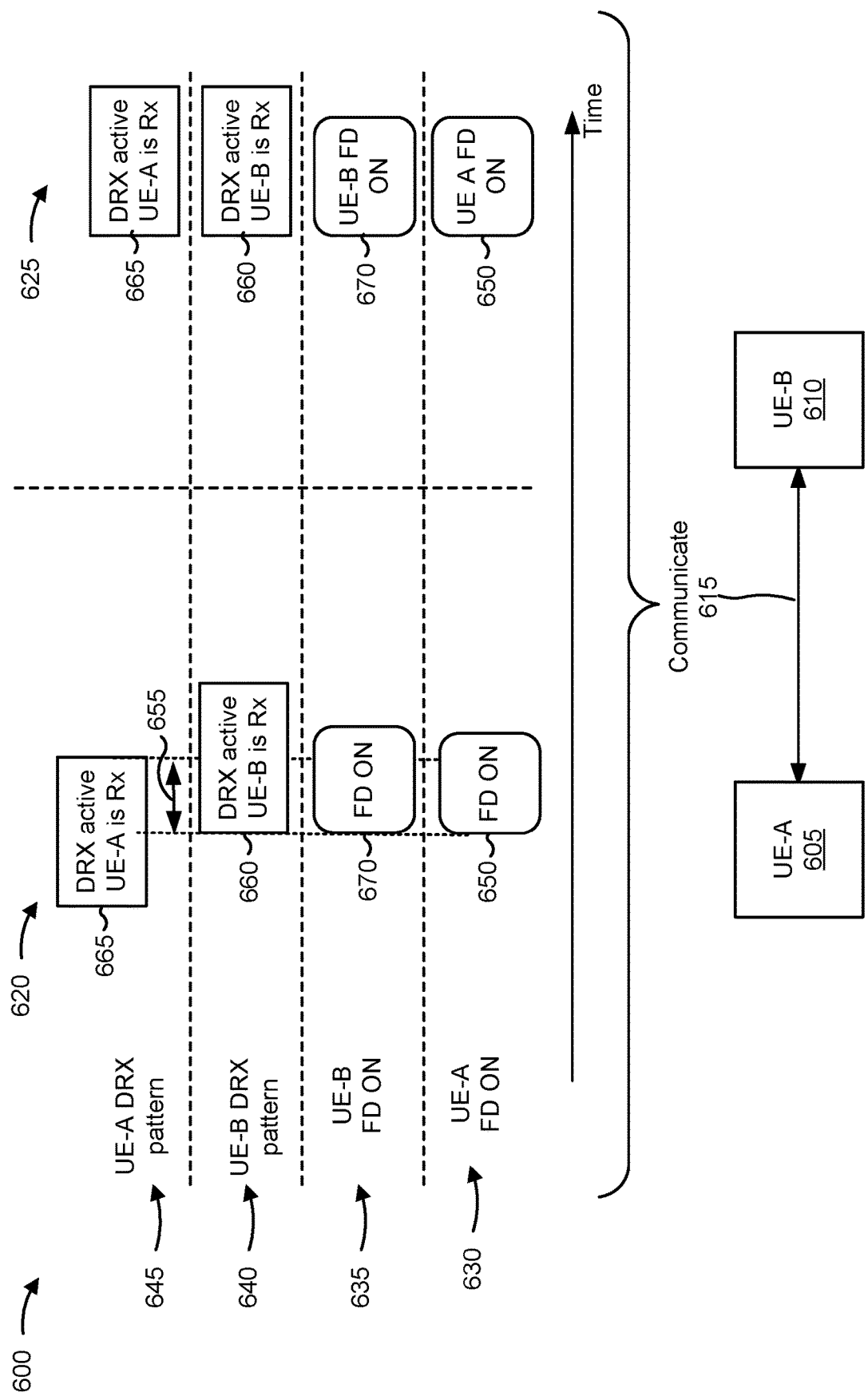
FIGS. 6-8 are diagrams illustrating examples associated with dynamic full-duplex mode switching for sidelink, in accordance with the present disclosure.

FIG. 6 is a diagram illustrating an example 600 associated with dynamic FD mode switching for SL, in accordance with the present disclosure. As shown in FIG. 6, a UE-A 605 and a UE-B 610 may communicate with one another via an SL network. In some aspects, the UE-A 605 may be, or be similar to, the UE-A 505 and the UE-B 610 may be, or be similar to, the UE-B 510. In some aspects, any number of additional UEs may communicate with one another and/or a base station (not shown). As shown by reference number 615, the UE-A 605 may communicate with the UE-B 610.

Example 600 illustrates two example configuration 620 and 625 that may be implemented by the UE-A 605 and the UE-B 610 to communicate with one another. The configurations 620 and 625 illustrate different examples of relationships between an FD ON duration pattern 630 (shown as "UE-A FD ON") associated with the UE-A 605, an FD ON duration pattern 635 (shown as "UE-B FD ON") associated with the UE-B 610, an SL DRX pattern 640 (shown as "UE-B DRX pattern") associated with the UE-B 610, and an SL DRX pattern 645 (shown as "UE-A DRX pattern") associated with the UE-A 605.

In some aspects, for a unicast/groupcast session between FD SL UEs, to save power, the UEs may prioritize simultaneous transmission and reception. To improve resource utilization, a same time resource may be used for transmissions sent from the UE-A 605 to the UE-B 610 and transmissions sent from the UE-B 610 to the UE-A 605. To achieve simultaneous transmission and reception, an intersection of the DRX ON durations associated with the UEs may be aligned and/or at least partially overlapping with the FD ON duration of the UEs. For example, as shown, the configuration 620 may include a UE-A FD ON duration 650 that is aligned with, and at least partially overlapping, an intersection 655 of a UE-B DRX ON duration 660 and a UE-A DRX ON duration 665. Additionally, the UE-B FD ON duration 670 may be aligned with, and at least partially overlapping, the intersection 655.

In some aspects, to facilitate aligning these durations, the UE-A 605 and the UE-B 610 may coordinate to determine the SL FD ON patterns and/or the SL DRX patterns. The configuration 625 may be an example of a configuration in which the UE-A 605 and the UE-B 610 coordinate to determine both the SL FD ON patterns and the SL DRX patterns. As shown, all of the durations 650, 660, 665, and 670 are aligned and at least partially overlapping.

As indicated above, FIG. 6 is provided as an example. Other examples may differ from what is described with respect to FIG. 6.

Figure 7:
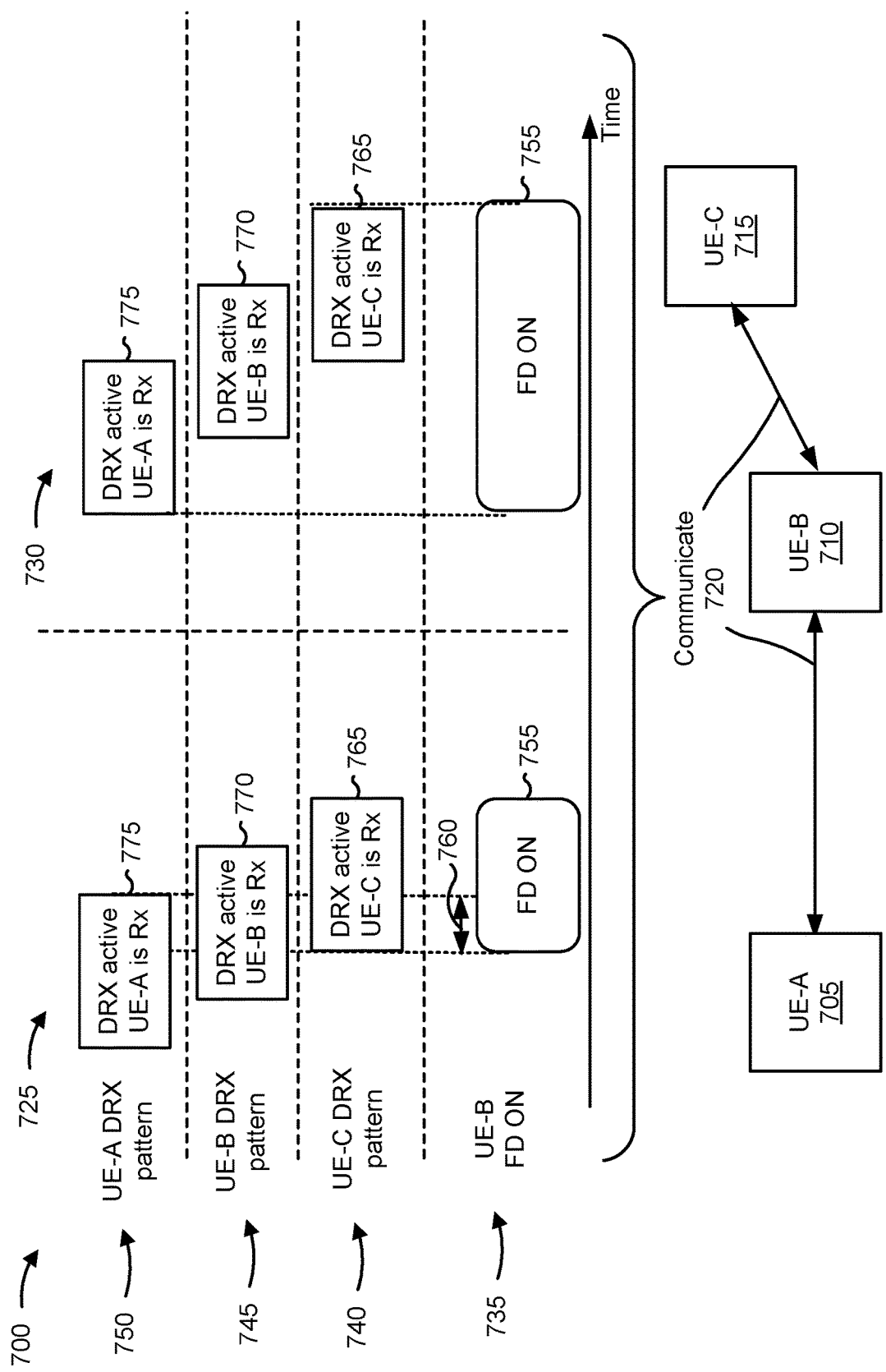

FIG. 7 is a diagram illustrating an example 700 associated with dynamic FD mode switching for SL, in accordance with the present disclosure. As shown in FIG. 7, a UE-A 705, a UE-B 710, and a UE-C 715 may communicate with one another via an SL network. In some aspects, the UE-A 705 may be, or be similar to, the UE-A 605 and/or the UE-A 505, and the UE-B 710 and/or the UE-C 715 may be, or be similar to, the UE-B 610 and/or the UE-B 710. In some aspects, any number of additional UEs may communicate with one another and/or a base station (not shown). As shown by reference number 720, the UE-B 710 may communicate with the UE-A 705 and the UE-C 715. In some aspects, the UE-A 705 may communicate with the UE-C 715.

Example 700 illustrates two example configuration 725 and 730 that may be implemented by the UEs 705, 710, and 715 to communicate with one another. The configurations 725 and 730 illustrate different examples of relationships between an FD ON duration pattern 735 (shown as "UE-A FD ON") associated with the UE-B 710, an SL DRX pattern 740 (shown as "UE-C DRX pattern") associated with the UE-C 715, an SL DRX pattern 745 (shown as "UE-B DRX pattern") associated with the UE-B 710, and an SL DRX pattern 750 (shown as "UE-A DRX pattern") associated with the UE-A 705.

As discussed above, FD ON durations of a transmitting UE should align and/or at least partially overlap with DRX ON durations of receiving UEs. Example 700 illustrates an example in which there is more than one receiving UE. To realize the benefit of simultaneous transmission and reception, the FD ON duration of the transmitting UE may align and/or overlap with the intersection of the DRX ON durations associated with the receiving UEs. For example, as shown, the configuration 725 includes a UE-B FD ON duration 755 that is aligned with an intersection 760 of the UE-C DRX ON duration 765, the UE-B DRX ON duration 770, and the UE-A DRX ON duration 775. In the configuration 730, the UE-B FD ON duration 755 is aligned with the UE-A DRX ON duration 775 and completely overlaps all of the UE DRX ON durations 765, 770, and 775.

As indicated above, FIG. 7 is provided as an example. Other examples may differ from what is described with respect to FIG. 7.

Figure 8:
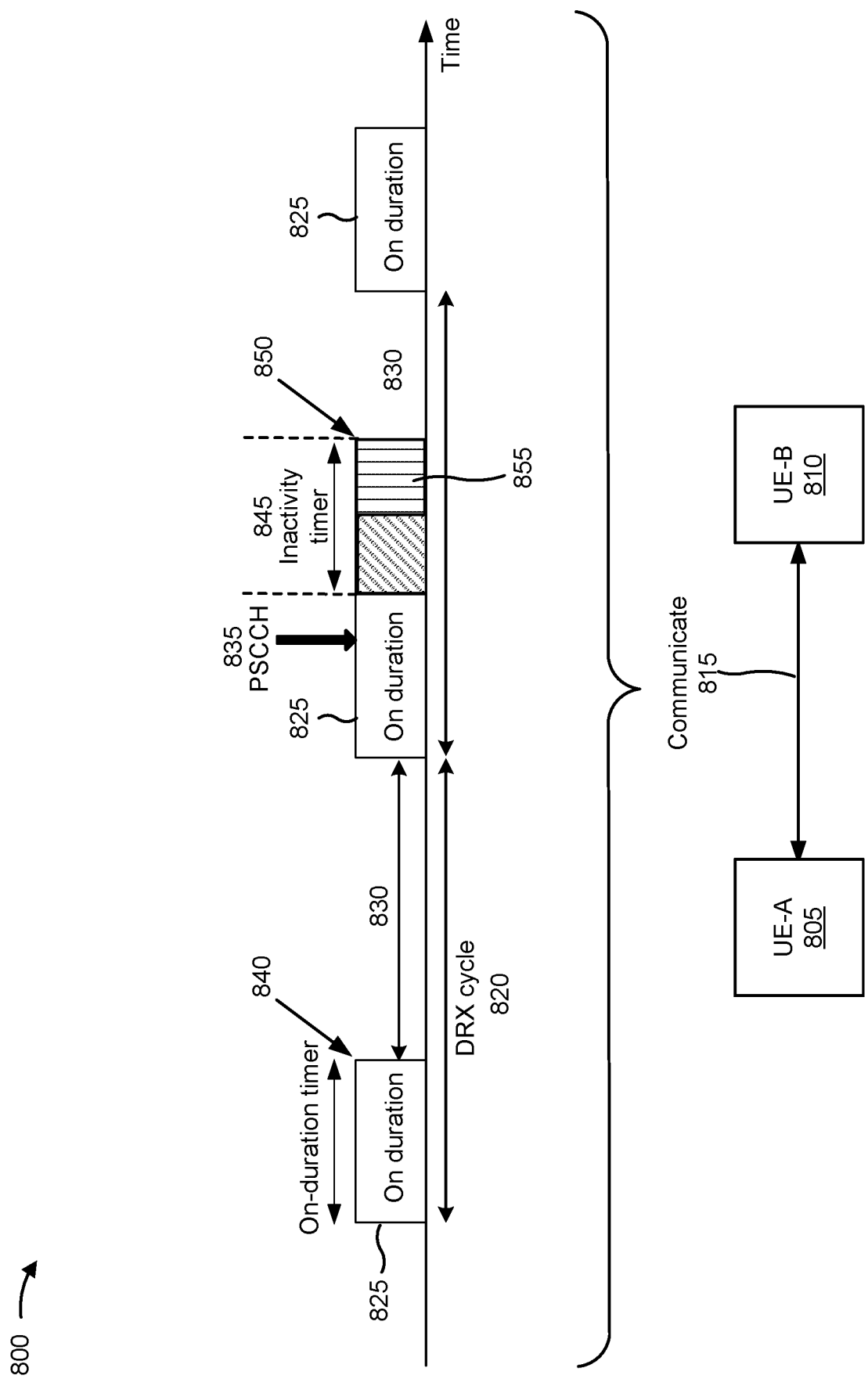

FIG. 8 is a diagram illustrating an example 800 associated with dynamic FD mode switching for SL, in accordance with the present disclosure. As shown by reference number 815, a UE-A 805 and a UE-B 810 may communicate with one another via an SL network. In some aspects, any number of additional UEs may communicate with one another and/or a base station (not shown). In some aspects, the UE-A 805 may be, or be similar to, the UE-A 705, UE-A 605, and/or the UE-A 505, and the UE-B 810 may be, or be similar to, the UE-B 710, UE-B 610, and/or the UE-B 510.

As shown in FIG. 8, a DRX cycle 820 may be configured for the UE-A 805. A DRX cycle 820 may include a DRX ON duration 825 (e.g., during which the UE-A 805 is awake or in an active state) and an opportunity to enter a DRX sleep state 830. As used herein, the time during which the UE-A 805 is configured to be in an active state during the DRX ON duration 825 may be referred to as an active time, and the time during which the UE-A 805 is configured to be in the DRX sleep state 830 may be referred to as an inactive time.

During the DRX ON duration 825 (e.g., the active time), the UE-A 805 may monitor an SL control channel (e.g., a PSCCH), as shown by reference number 835. For example, the UE-A 805 may monitor the PSCCH for SCI pertaining to the UE-A 805. If the UE-A 805 does not detect and/or successfully decode any PSCCH communications intended for the UE-A 805 during the DRX ON duration 825, then the UE-A 805 may enter the sleep state 830 (e.g., for the inactive time) at the end of the DRX on duration 825, as shown by reference number 840. In this way, the UE-A 805 may conserve battery power and reduce power consumption. As shown, the DRX cycle 820 may repeat with a configured periodicity according to the DRX configuration.

If the UE-A 805 detects and/or successfully decodes a PSCCH communication intended for the UE-A 805, then the UE-A 805 may remain in an active state (e.g., awake) for the duration of a DRX inactivity timer 845 (e.g., which may extend the active time). The UE-A 805 may start the DRX inactivity timer 845 at a time at which the PSCCH communication is received (e.g., in a TTI in which the PSCCH communication is received, such as a slot or a subframe). The UE-A 805 may remain in the active state until the DRX inactivity timer 845 expires, at which time the UE-A 805 may enter the sleep state 830 (e.g., for the inactive time), as shown by reference number 850. During the duration of the DRX inactivity timer 845, the UE-A 805 may continue to monitor for PSCCH communications, may obtain an SL data communication (e.g., on an SL data channel, such as a PSSCH) scheduled by the PSCCH communication, and/or may prepare and/or transmit an SL communication. The UE-A 805 may restart the DRX inactivity timer 845 after each detection of a PSCCH communication for the UE-A 805 for an initial transmission (e.g., but not for a retransmission). By operating in this manner, the UE-A 805 0 may conserve battery power and reduce power consumption by entering the sleep state 830.

In some aspects, if an inactivity timer 845 extends a DRX ON duration of the UE-A 805, and if an FD ON duration of a transmitting UE (e.g., UE-B 810) is aligned with the DRX ON duration of the UE-A 805, then the FD ON duration may also be extended. As shown in FIG. 8, for example, an extension portion 855 of the FD ON duration may overlap the extended portion of the DRX ON duration indicated by the inactivity timer 845. In some aspects, for the case where an FD ON duration is aligned with an intersection of DRX ON durations of multiple UEs, the FD capability may be active whenever DRX active time is overlapping (whether due to a DRX ON duration or an inactivity timer). For example, in some aspects, a second SL FD mode may include an SL FD ON mode in which an FD capability of a first UE is activated, where the SL FD ON mode corresponds to a first FD ON duration associated with the first UE, the SL FD ON mode is aligned with an intersection of a plurality of DRX ON durations associated with a plurality of additional UEs that includes a second UE, and an inactivity timer extends a length of a DRX ON duration of the plurality of DRX ON durations. The transmitting UE may extend a length of the first SL FD ON duration to be aligned with a DRX active time associated with at least one of the second UE or the plurality of additional UEs that overlaps with a DRX active time associated with the first UE. In some aspects, where a semi-static configuration is used, the FD ON duration may be fixed and based on an original DRX ON duration (e.g., not affected by an inactivity timer).

As indicated above, FIG. 8 is provided as an example. Other examples may differ from what is described with respect to FIG. 8.

Figure 9:
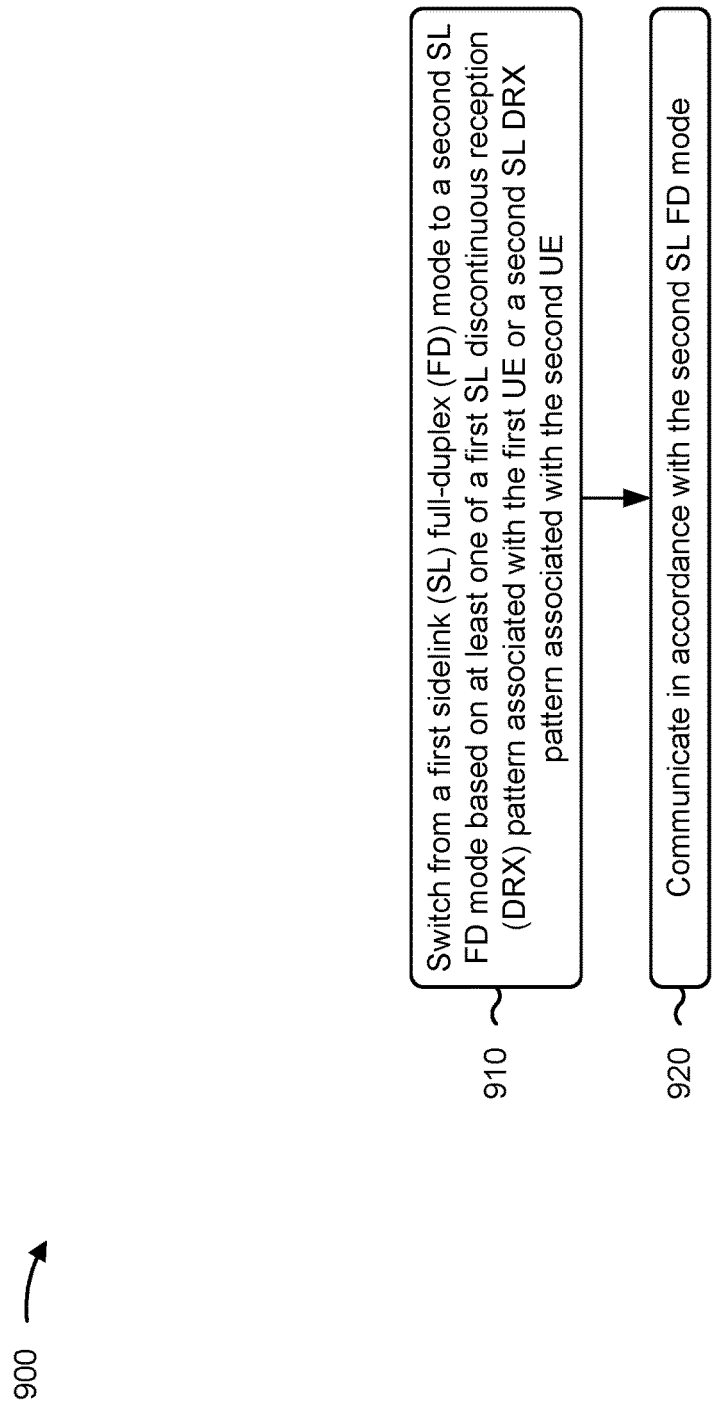
FIGS. 9 and 10 are diagrams illustrating example processes associated with dynamic full-duplex mode switching for sidelink, in accordance with the present disclosure.

FIG. 9 is a diagram illustrating an example process 900 performed, for example, by a first UE, in accordance with the present disclosure. Example process 900 is an example where the UE (e.g., UE 120) performs operations associated with dynamic FD mode switching for SL.

As shown in FIG. 9, in some aspects, process 900 may include switching from a first SL FD mode to a second SL FD mode based on at least one of a first SL DRX pattern associated with the first UE or a second SL DRX pattern associated with the second UE (block 910). For example, the UE (e.g., using communication manager 140 depicted in FIG. 11) may switch from a first SL FD mode to a second SL FD mode based on at least one of a first SL DRX pattern associated with the first UE or a second SL DRX pattern associated with the second UE, as described above.

As further shown in FIG. 9, in some aspects, process 900 may include communicating in accordance with the second SL FD mode (block 920). For example, the UE (e.g., using communication manager 140, the reception component 1102, and/or the transmission component 1104, depicted in FIG. 11) may communicate in accordance with the second SL FD mode, as described above.

Process 900 may include additional aspects, such as any single aspect or any combination of aspects described below and/or in connection with one or more other processes described elsewhere herein.

In a first aspect, the second SL FD mode comprises an SL FD ON mode in which an FD capability of the first UE is activated, wherein the SL FD ON mode corresponds to an FD ON duration, and wherein the FD ON duration is based on at least one of a first DRX ON duration of the first SL DRX pattern or a second DRX ON duration of the second SL DRX pattern.

In a second aspect, alone or in combination with the first aspect, the FD ON duration at least partially overlaps the second DRX ON duration.

In a third aspect, alone or in combination with one or more of the first and second aspects, the FD ON duration is aligned with the second DRX ON duration.

In a fourth aspect, alone or in combination with one or more of the first through third aspects, the FD ON duration at least partially overlaps a third DRX ON duration in which an FD capability of a third UE is activated.

In a fifth aspect, alone or in combination with one or more of the first through fourth aspects, the FD ON duration at least partially overlaps the first DRX ON duration.

In a sixth aspect, alone or in combination with one or more of the first through fifth aspects, the FD ON duration is aligned with the first DRX ON duration.

In a seventh aspect, alone or in combination with the first aspect, the FD ON duration does not overlap the first DRX ON duration.

In an eighth aspect, alone or in combination with one or more of the first through sixth aspects, the FD ON duration is aligned with an intersection of the first DRX ON duration and the second DRX ON duration.

In a ninth aspect, alone or in combination with one or more of the first through sixth or eighth aspects, the FD ON duration is aligned with an intersection of the first DRX ON duration, the second DRX ON duration, and a third DRX ON duration in which an FD capability of a third UE is activated.

In a tenth aspect, alone or in combination with one or more of the first through ninth aspects, the FD ON duration is aligned with at least one additional FD ON duration in which an FD capability of at least one of the second UE or a third UE is activated.

In an eleventh aspect, alone or in combination with one or more of the first through tenth aspects, communicating in accordance with the second SL FD mode comprises communicating in a unicast session with the second UE.

In a twelfth aspect, alone or in combination with one or more of the first through eleventh aspects, communicating in accordance with the second SL FD mode comprises transmitting an SL communication to the second UE, the method further comprising transmitting an indication of the second SL DRX pattern to the second UE.

In a thirteenth aspect, alone or in combination with one or more of the first through twelfth aspects, communicating in accordance with the second SL FD mode comprises communicating in a unicast session with the second UE, the method further comprising determining an FD DRX pattern associated with the first UE.

In a fourteenth aspect, alone or in combination with one or more of the first through thirteenth aspects, communicating in accordance with the second SL FD mode comprises receiving an SL communication from the second UE, the method further comprising receiving an indication of the first SL DRX pattern from the second UE.

In a fifteenth aspect, alone or in combination with one or more of the first through fourteenth aspects, process 900 includes coordinating with at least one of the second UE or a third UE to determine an FD DRX pattern associated with the first UE.

In a sixteenth aspect, alone or in combination with one or more of the first through fifteenth aspects, process 900 includes receiving, from a base station, an indication of at least one of the first SL DRX pattern or an indication of an FD DRX pattern associated with the first UE.

In a seventeenth aspect, alone or in combination with one or more of the first through sixteenth aspects, communicating in accordance with the second SL FD mode comprises transmitting an SL communication to the second UE, and wherein an inactivity timer extends a length of a DRX ON duration of the second SL DRX pattern, the method further comprising extending a length of an SL FD ON duration based on the inactivity timer.

In an eighteenth aspect, alone or in combination with one or more of the first through seventeenth aspects, the second SL FD mode comprises an SL FD ON mode in which an FD capability of the first UE is activated, wherein the SL FD ON mode corresponds to a first FD ON duration associated with the first UE, wherein the SL FD ON mode is aligned with an intersection of a plurality of DRX ON durations associated with a plurality of additional UEs that includes the second UE, and wherein an inactivity timer extends a length of a DRX ON duration of the plurality of DRX ON durations, the method further comprising extending a length of the first SL FD ON duration to be aligned with a DRX active time associated with at least one of the second UE or the plurality of additional UEs that overlaps with a DRX active time associated with the first UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
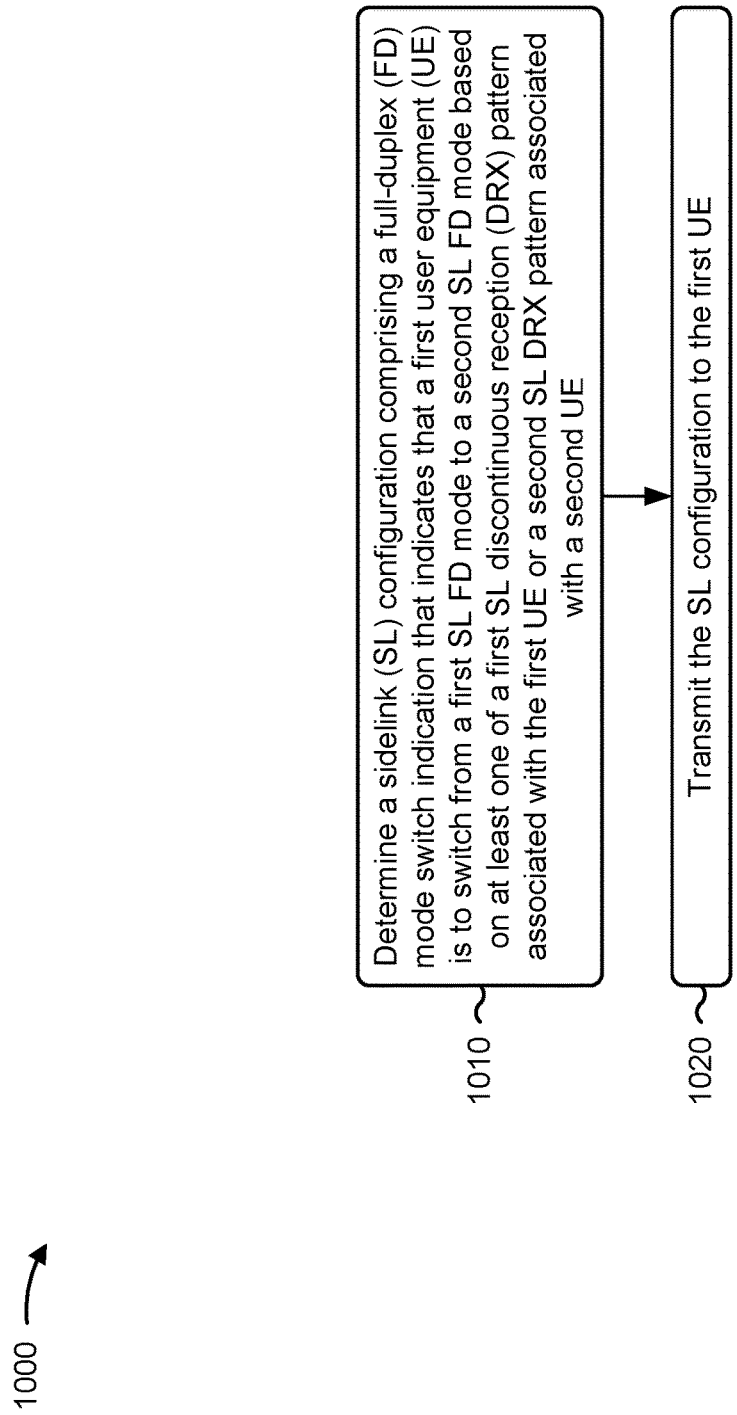

FIG. 10 is a diagram illustrating an example process 1000 performed, for example, by a base station, in accordance with the present disclosure. Example process 1000 is an example where the base station (e.g., base station 110) performs operations associated with dynamic FD mode switching for SL.

As shown in FIG. 10, in some aspects, process 1000 may include determining an SL configuration comprising an FD mode switch indication that indicates that a first UE is to switch from a first SL FD mode to a second SL FD mode based on at least one of a first SL DRX pattern associated with the first UE or a second SL DRX pattern associated with a second UE (block 1010). For example, the base station (e.g., using communication manager 150 depicted in FIG. 12) may determine a SL configuration comprising a FD mode switch indication that indicates that a first UE is to switch from a first SL FD mode to a second SL FD mode based on at least one of a first SL DRX pattern associated with the first UE or a second SL DRX pattern associated with a second UE, as described above.

As further shown in FIG. 10, in some aspects, process 1000 may include transmitting the SL configuration to the first UE (block 1020). For example, the base station (e.g., using communication manager 150 and/or transmission component 1204, depicted in FIG. 12) may transmit the SL configuration to the first UE, as described above.

Process 1000 may include additional aspects, such as any single aspect or any combination of aspects described below and/or in connection with one or more other processes described elsewhere herein.

In a first aspect, the second SL FD mode comprises an SL FD ON mode in which an FD capability of the first UE is activated, wherein the SL FD ON mode corresponds to an FD ON duration, and wherein the FD ON duration is based on at least one of a first DRX ON duration of the first SL DRX pattern or a second DRX ON duration of the second SL DRX pattern.

In a second aspect, alone or in combination with the first aspect, the FD ON duration at least partially overlaps the second DRX ON duration.

In a third aspect, alone or in combination with one or more of the first and second aspects, the FD ON duration is aligned with the second DRX ON duration.

In a fourth aspect, alone or in combination with one or more of the first through third aspects, the FD ON duration at least partially overlaps a third DRX ON duration in which an FD capability of a third UE is activated.

In a fifth aspect, alone or in combination with one or more of the first through fourth aspects, the FD ON duration at least partially overlaps the first DRX ON duration, is aligned with the first DRX ON duration, or does not overlap the first DRX ON duration.

In a sixth aspect, alone or in combination with one or more of the first through fifth aspects, the FD ON duration is aligned with an intersection of the first DRX ON duration and the second DRX ON duration.

In a seventh aspect, alone or in combination with one or more of the first through sixth aspects, the FD ON duration is aligned with an intersection of the first DRX ON duration, the second DRX ON duration, and a third DRX ON duration in which an FD capability of a third UE is activated.

In an eighth aspect, alone or in combination with one or more of the first through seventh aspects, the FD ON duration is aligned with at least one additional FD ON duration in which an FD capability of at least one of the second UE or a third UE is activated.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
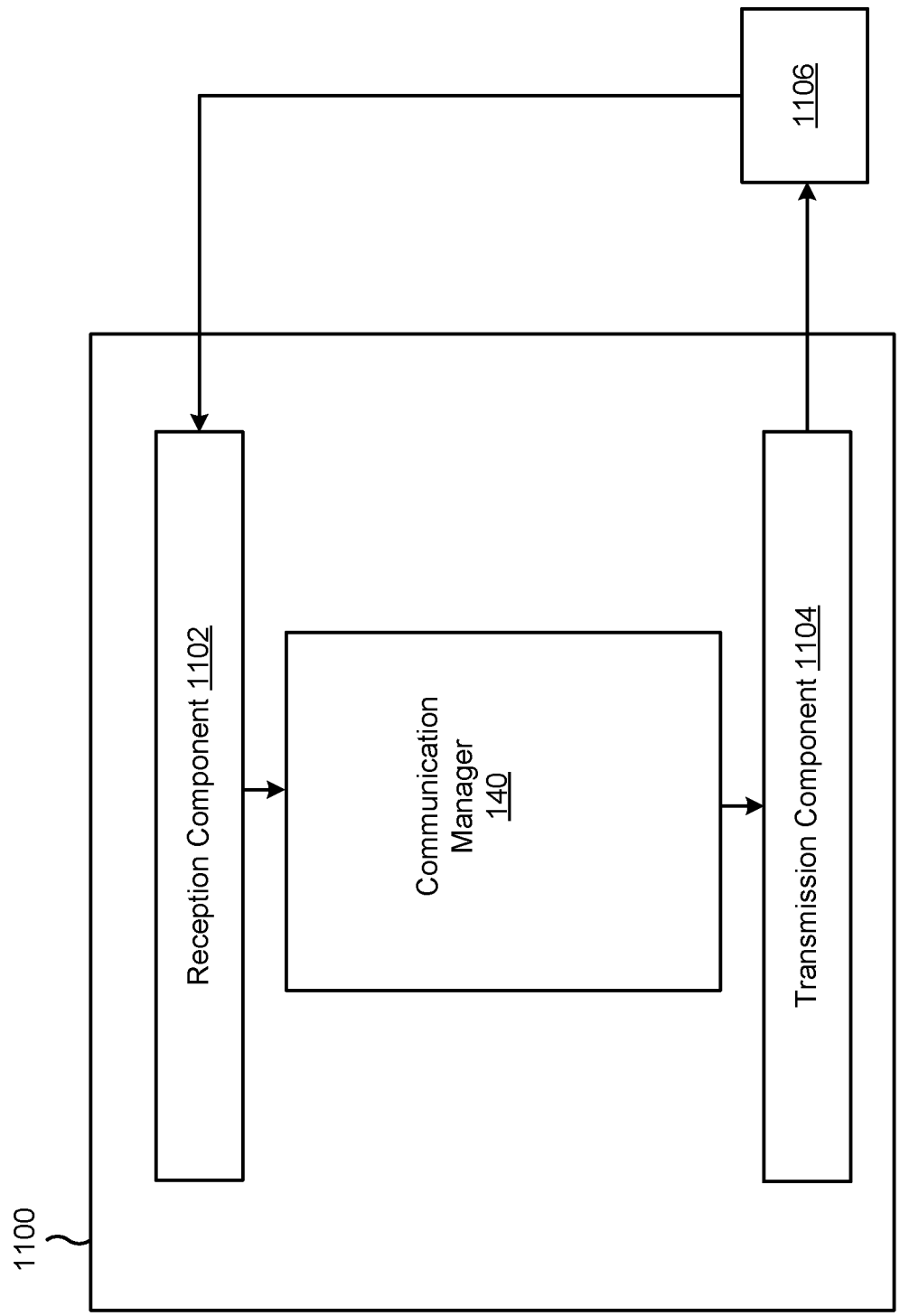
FIGS. 11 and 12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140.

In some aspects, the apparatus 1100 may be configured to perform one or more operations described herein in connection with FIGS. 5-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 140 may switch from a first SL FD mode to a second SL FD mode based on at least one of a first SL DRX pattern associated with the first UE or a second SL DRX pattern associated with the second UE. The communication manager 140, reception component 1102, and/or transmission component 1104 may communicate in accordance with the second SL FD mode. In some aspects, the communication manager 140 may include one or more antennas, a modem, a modulator, a transmit MIMO processor, a transmit processor, a controller/processor, a memory, or a combination thereof, of the UE described in connection with FIG. 2. In some aspects, the communication manager 140 may include the reception component 1102 and/or the transmission component 1104.

The communication manager 140 may coordinate with at least one of the second UE or a third UE to determine an FD DRX pattern associated with the first UE.

The reception component 1102 may receive, from a base station, an indication of at least one of the first SL DRX pattern or an indication of an FD DRX pattern associated with the first UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
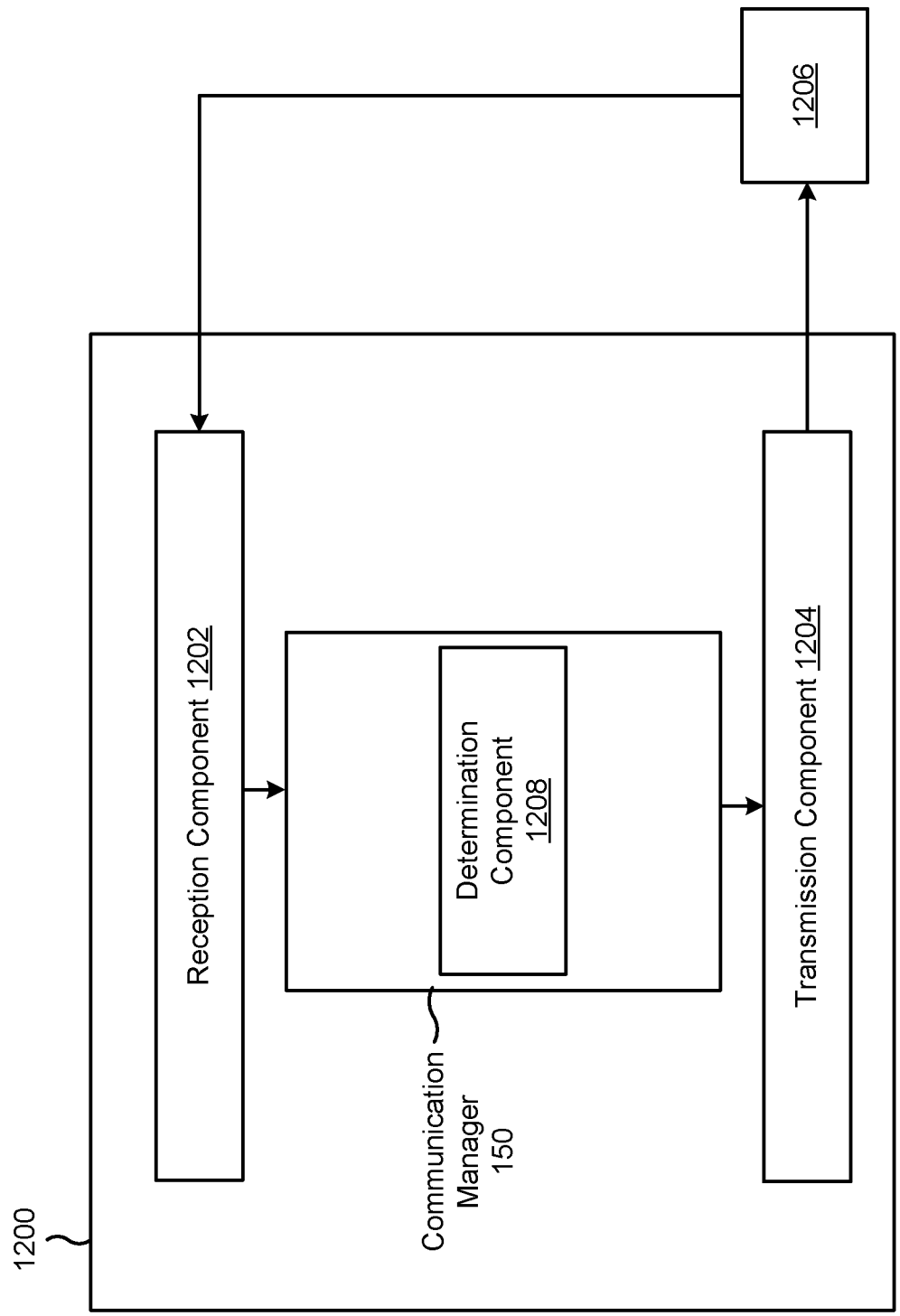

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a determination component 1208.

In some aspects, the apparatus 1200 may be configured to perform one or more operations described herein in connection with FIGS. 5-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The communication manager 150 and/or the determination component 1208 may determine a SL configuration comprising a FD mode switch indication that indicates that a first UE is to switch from a first SL FD mode to a second SL FD mode based on at least one of a first SL DRX pattern associated with the first UE or a second SL DRX pattern associated with a second UE. The transmission component 1204 may transmit the SL configuration to the first UE.

In some aspects, the communication manager 150 may include one or more antennas, a modem, a modulator, a transmit MIMO processor, a transmit processor, a controller/processor, a memory, or a combination thereof, of the base station described in connection with FIG. 2. In some aspects, the communication manager 150 may include the reception component 1202 and/or the transmission component 1204. In some aspects, the determination component 1208 may include one or more antennas, a modem, a modulator, a transmit MIMO processor, a transmit processor, a controller/processor, a memory, or a combination thereof, of the base station described in connection with FIG. 2. In some aspects, the determination component 1208 may include the reception component 1202 and/or the transmission component 1204.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a first user equipment (UE), comprising: switching from a first sidelink (SL) full-duplex (FD) mode to a second SL FD mode based on at least one of a first SL discontinuous reception (DRX) pattern associated with the first UE or a second SL DRX pattern associated with the second UE; and communicating in accordance with the second SL FD mode.

Aspect 2: The method of Aspect 1, wherein the second SL FD mode comprises an SL FD ON mode in which an FD capability of the first UE is activated, wherein the SL FD ON mode corresponds to an FD ON duration, and wherein the FD ON duration is based on at least one of a first DRX ON duration of the first SL DRX pattern or a second DRX ON duration of the second SL DRX pattern.

Aspect 3: The method of Aspect 2, wherein the FD ON duration at least partially overlaps the second DRX ON duration.

Aspect 4: The method of either of Aspects 2 or 3, wherein the FD ON duration is aligned with the second DRX ON duration.

Aspect 5: The method of Aspect 4, wherein the FD ON duration at least partially overlaps a third DRX ON duration in which an FD capability of a third UE is activated.

Aspect 6: The method of any of Aspects 2-5, wherein the FD ON duration at least partially overlaps the first DRX ON duration.

Aspect 7: The method of any of Aspects 2-6, wherein the FD ON duration is aligned with the first DRX ON duration.

Aspect 8: The method of Aspect 2, wherein the FD ON duration does not overlap the first DRX ON duration.

Aspect 9: The method of any of Aspects 2-7, wherein the FD ON duration is aligned with an intersection of the first DRX ON duration and the second DRX ON duration.

Aspect 10: The method of Aspect 9, wherein the FD ON duration is aligned with an intersection of the first DRX ON duration, the second DRX ON duration, and a third DRX ON duration in which an FD capability of a third UE is activated.

Aspect 11: The method of any of Aspects 2-10, wherein the FD ON duration is aligned with at least one additional FD ON duration in which an FD capability of at least one of the second UE or a third UE is activated.

Aspect 12: The method of Aspect 11, wherein communicating in accordance with the second SL FD mode comprises communicating in a unicast session with the second UE.

Aspect 13: The method of any of Aspects 1-12, wherein communicating in accordance with the second SL FD mode comprises transmitting an SL communication to the second UE, the method further comprising transmitting an indication of the second SL DRX pattern to the second UE.

Aspect 14: The method of Aspect 13, wherein communicating in accordance with the second SL FD mode comprises communicating in a unicast session with the second UE, the method further comprising determining an FD DRX pattern associated with the first UE.

Aspect 15: The method of any of Aspects 1-14, wherein communicating in accordance with the second SL FD mode comprises receiving an SL communication from the second UE, the method further comprising receiving an indication of the first SL DRX pattern from the second UE.

Aspect 16: The method of any of Aspects 1-15, further comprising coordinating with at least one of the second UE or a third UE to determine an FD DRX pattern associated with the first UE.

Aspect 17: The method of any of Aspects 1-16, further comprising receiving, from a base station, an indication of at least one of the first SL DRX pattern or an indication of an FD DRX pattern associated with the first UE.

Aspect 18: The method of any of Aspects 1-17, wherein communicating in accordance with the second SL FD mode comprises transmitting an SL communication to the second UE, and wherein an inactivity timer extends a length of a DRX ON duration of the second SL DRX pattern, the method further comprising extending a length of an SL FD ON duration based on the inactivity timer.

Aspect 19: The method of any of Aspects 1-18, wherein the second SL FD mode comprises an SL FD ON mode in which an FD capability of the first UE is activated, wherein the SL FD ON mode corresponds to a first FD ON duration associated with the first UE, wherein the SL FD ON mode is aligned with an intersection of a plurality of DRX ON durations associated with a plurality of additional UEs that includes the second UE, and wherein an inactivity timer extends a length of a DRX ON duration of the plurality of DRX ON durations, the method further comprising extending a length of the first SL FD ON duration to be aligned with a DRX active time associated with at least one of the second UE or the plurality of additional UEs that overlaps with a DRX active time associated with the first UE.

Aspect 20: A method of wireless communication performed by a base station, comprising: determining a sidelink (SL) configuration comprising a full-duplex (FD) mode switch indication that indicates that a first user equipment (UE) is to switch from a first SL FD mode to a second SL FD mode based on at least one of a first SL discontinuous reception (DRX) pattern associated with the first UE or a second SL DRX pattern associated with a second UE; and transmitting the SL configuration to the first UE.

Aspect 21: The method of Aspect 20, wherein the second SL FD mode comprises an SL FD ON mode in which an FD capability of the first UE is activated, wherein the SL FD ON mode corresponds to an FD ON duration, and wherein the FD ON duration is based on at least one of a first DRX ON duration of the first SL DRX pattern or a second DRX ON duration of the second SL DRX pattern.

Aspect 22: The method of Aspect 21, wherein the FD ON duration at least partially overlaps the second DRX ON duration.

Aspect 23: The method of either of Aspects 21 or 22, wherein the FD ON duration is aligned with the second DRX ON duration.

Aspect 24: The method of Aspect 23, wherein the FD ON duration at least partially overlaps a third DRX ON duration in which an FD capability of a third UE is activated.

Aspect 25: The method of any of Aspects 21-24, wherein the FD ON duration at least partially overlaps the first DRX ON duration, is aligned with the first DRX ON duration, or does not overlap the first DRX ON duration.

Aspect 26: The method of any of Aspects 21-25, wherein the FD ON duration is aligned with an intersection of the first DRX ON duration and the second DRX ON duration.

Aspect 27: The method of Aspect 26, wherein the FD ON duration is aligned with an intersection of the first DRX ON duration, the second DRX ON duration, and a third DRX ON duration in which an FD capability of a third UE is activated.

Aspect 28: The method of any of Aspects 21-27, wherein the FD ON duration is aligned with at least one additional FD ON duration in which an FD capability of at least one of the second UE or a third UE is activated.

Aspect 29: An apparatus for wireless communication at a device, comprising a processor; memory coupled with the processor; and instructions stored in the memory and executable by the processor to cause the apparatus to perform the method of one or more of Aspects 1-19.

Aspect 30: A device for wireless communication, comprising a memory and one or more processors coupled to the memory, the one or more processors configured to perform the method of one or more of Aspects 1-19.

Aspect 31: An apparatus for wireless communication, comprising at least one means for performing the method of one or more of Aspects 1-19.

Aspect 32: A non-transitory computer-readable medium storing code for wireless communication, the code comprising instructions executable by a processor to perform the method of one or more of Aspects 1-19.

Aspect 33: A non-transitory computer-readable medium storing a set of instructions for wireless communication, the set of instructions comprising one or more instructions that, when executed by one or more processors of a device, cause the device to perform the method of one or more of Aspects 1-19.

Aspect 34: An apparatus for wireless communication at a device, comprising a processor; memory coupled with the processor; and instructions stored in the memory and executable by the processor to cause the apparatus to perform the method of one or more of Aspects 20-28.

Aspect 35: A device for wireless communication, comprising a memory and one or more processors coupled to the memory, the one or more processors configured to perform the method of one or more of Aspects 20-28.

Aspect 36: An apparatus for wireless communication, comprising at least one means for performing the method of one or more of Aspects 20-28.

Aspect 37: A non-transitory computer-readable medium storing code for wireless communication, the code comprising instructions executable by a processor to perform the method of one or more of Aspects 20-28.

Aspect 38: A non-transitory computer-readable medium storing a set of instructions for wireless communication, the set of instructions comprising one or more instructions that, when executed by one or more processors of a device, cause the device to perform the method of one or more of Aspects 20-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   switching from a first sidelink (SL) full-duplex (FD) mode to a second SL FD mode based on at least one of a first SL discontinuous reception (DRX) pattern associated with the first UE or a second SL DRX pattern associated with the second UE; and
   communicating in accordance with the second SL FD mode, wherein the second SL FD mode comprises an SL FD ON mode in which an FD capability of the first UE is activated, wherein the SL FD ON mode corresponds to an FD ON duration, and wherein the FD ON duration is based on at least one of a first DRX ON duration of the first SL DRX pattern or a second DRX ON duration of the second SL DRX pattern.

2. The method of claim 1, wherein the FD ON duration at least partially overlaps the second DRX ON duration.

3. The method of claim 1, wherein the FD ON duration is aligned with the second DRX ON duration.

4. The method of claim 3, wherein the FD ON duration at least partially overlaps a third DRX ON duration in which an FD capability of a third UE is activated.

5. The method of claim 1, wherein the FD ON duration at least partially overlaps the first DRX ON duration.

6. The method of claim 1, wherein the FD ON duration is aligned with the first DRX ON duration.

7. The method of claim 1, wherein the FD ON duration does not overlap the first DRX ON duration.

8. The method of claim 1, wherein the FD ON duration is aligned with an intersection of the first DRX ON duration and the second DRX ON duration.

9. The method of claim 8, wherein the FD ON duration is aligned with an intersection of the first DRX ON duration, the second DRX ON duration, and a third DRX ON duration in which an FD capability of a third UE is activated.

10. The method of claim 1, wherein the FD ON duration is aligned with at least one additional FD ON duration in which an FD capability of at least one of the second UE or a third UE is activated.

11. The method of claim 10, wherein communicating in accordance with the second SL FD mode comprises communicating in a unicast session with the second UE.

12. The method of claim 1, wherein communicating in accordance with the second SL FD mode comprises transmitting an SL communication to the second UE, the method further comprising transmitting an indication of the second SL DRX pattern to the second UE.

13. The method of claim 12, wherein communicating in accordance with the second SL FD mode comprises communicating in a unicast session with the second UE, the method further comprising determining an FD DRX pattern associated with the first UE.

14. The method of claim 1, wherein communicating in accordance with the second SL FD mode comprises transmitting an SL communication to the second UE, and wherein an inactivity timer extends a length of a DRX ON duration of the second SL DRX pattern, the method further comprising extending a length of an SL FD ON duration based on the inactivity timer.

15. The method of claim 1, wherein the second SL FD mode comprises an SL FD ON mode in which an FD capability of the first UE is activated, wherein the SL FD ON mode corresponds to a first FD ON duration associated with the first UE, wherein the SL FD ON mode is aligned with an intersection of a plurality of DRX ON durations associated with a plurality of additional UEs that includes the second UE, and wherein an inactivity timer extends a length of a DRX ON duration of the plurality of DRX ON durations, the method further comprising extending a length of the first SL FD ON duration to be aligned with a DRX active time associated with at least one of the second UE or the plurality of additional UEs that overlaps with a DRX active time associated with the first UE.

16. A first user equipment (UE) for wireless communication, comprising:
a memory; and
one or more processors, coupled to the memory, configured to:
switch from a first sidelink (SL) full-duplex (FD) mode to a second SL FD mode based on at least one of a first SL discontinuous reception (DRX) pattern associated with the first UE or a second SL DRX pattern associated with the second UE; and
communicate in accordance with the second SL FD mode, wherein the second SL FD mode comprises an SL FD ON mode in which an FD capability of the first UE is activated, wherein the SL FD ON mode corresponds to an FD ON duration, and wherein the FD ON duration is based on at least one of a first DRX ON duration of the first SL DRX pattern or a second DRX ON duration of the second SL DRX pattern.

* * * * *